(12) United States Patent
Toumazet et al.

(10) Patent No.: US 9,587,961 B2
(45) Date of Patent: Mar. 7, 2017

(54) AIRCRAFT DISPLAY MANAGEMENT SYSTEM FOR FLIGHT ENVELOPE PROTECTION

(71) Applicant: Airbus (S.A.S.), Blagnac (FR)

(72) Inventors: Jean-Jacques Toumazet, Saint-Jean (FR); Mélanie Vadillo, Toulouse (FR)

(73) Assignee: Airbus (SAS), Blagnac (FR)

( * ) Notice: Subject to any disclaimer, the term of this patent is extended or adjusted under 35 U.S.C. 154(b) by 0 days.

(21) Appl. No.: 14/819,956

(22) Filed: Aug. 6, 2015

(65) Prior Publication Data

US 2017/0038223 A1  Feb. 9, 2017

(51) Int. Cl.
*G01C 23/00* (2006.01)
*B64D 45/00* (2006.01)

(52) U.S. Cl.
CPC .......... *G01C 23/005* (2013.01); *B64D 45/00* (2013.01); *B64D 2700/62271* (2013.01)

(58) Field of Classification Search
None
See application file for complete search history.

(56) References Cited

U.S. PATENT DOCUMENTS

| | | | | |
|---|---|---|---|---|
| 2007/0020588 A1* | 1/2007 | Batcheller | ............ | G09B 19/165 434/30 |
| 2008/0231473 A1* | 9/2008 | Wyatt | ............ | G01C 23/00 340/971 |
| 2009/0267800 A1* | 10/2009 | Hammack | ............ | G01C 23/00 340/973 |
| 2010/0073198 A1* | 3/2010 | Wegner | ............ | G01C 23/00 340/946 |
| 2011/0172855 A1* | 7/2011 | Marstall | ............ | G05D 1/0808 701/9 |
| 2014/0232568 A1* | 8/2014 | Pennell | ............ | B64D 45/00 340/967 |

\* cited by examiner

*Primary Examiner* — Leon-Viet Nguyen
(74) *Attorney, Agent, or Firm* — Greer, Burns & Crain Ltd.

(57) ABSTRACT

A display management system is provided for displaying a graphical representation of flight envelope information of an aircraft. Included in the display management system is a control module being coupled to the display management system and programmed to control the graphical representation including at least one flight envelope protection attribute. A signal detection module receives signals from a plurality of sensors of the aircraft, and the received signals include associated parameter values for the at least one flight envelope protection attribute. A protection selection module selects the at least one flight envelope protection attribute based on the received signals and parameter values. A display module displays the at least one flight envelope protection attribute on a display screen in relation to a flight control law state stored in a database using a display model of the aircraft from an elevational view based on the received signals and parameter values.

19 Claims, 9 Drawing Sheets

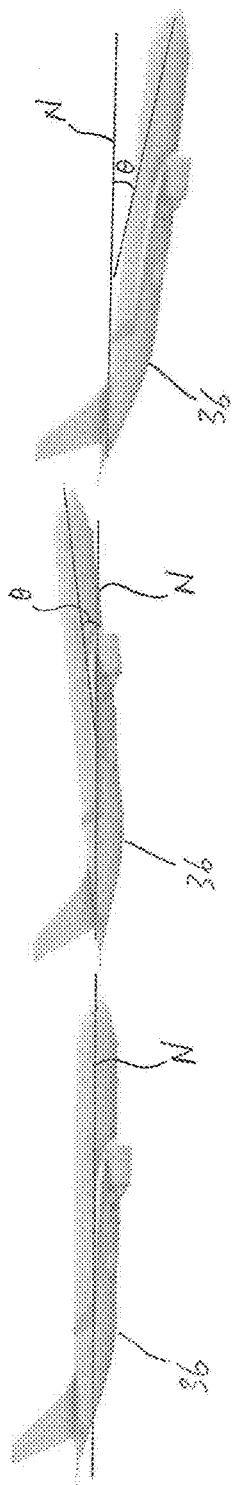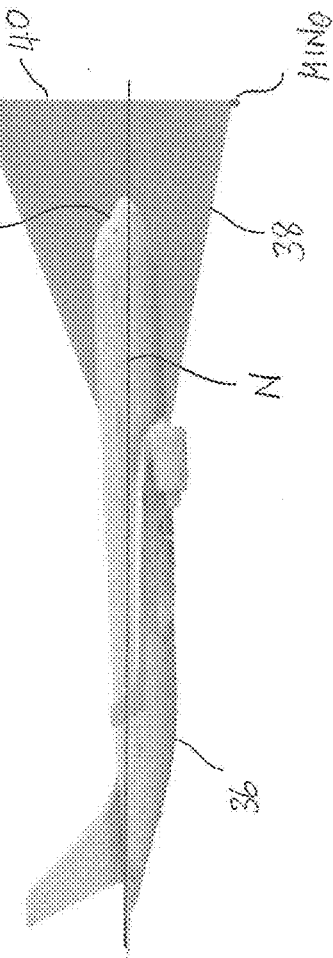

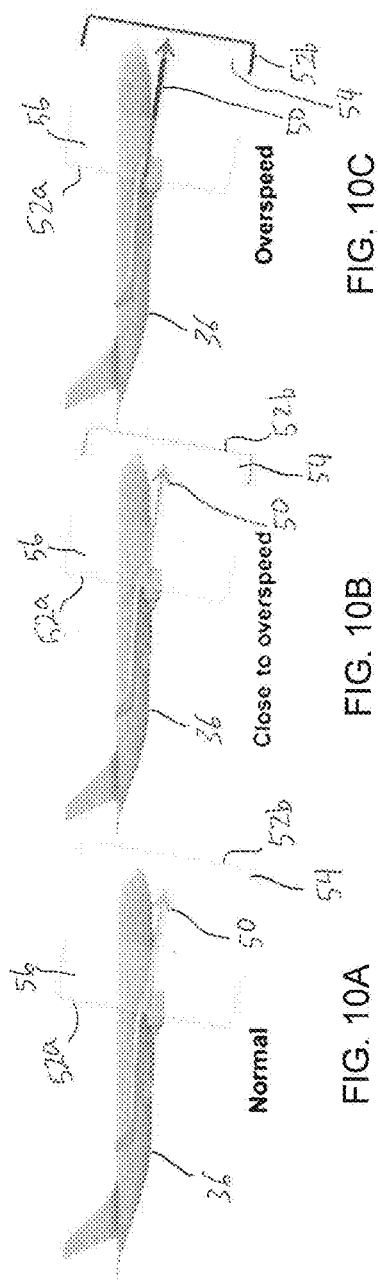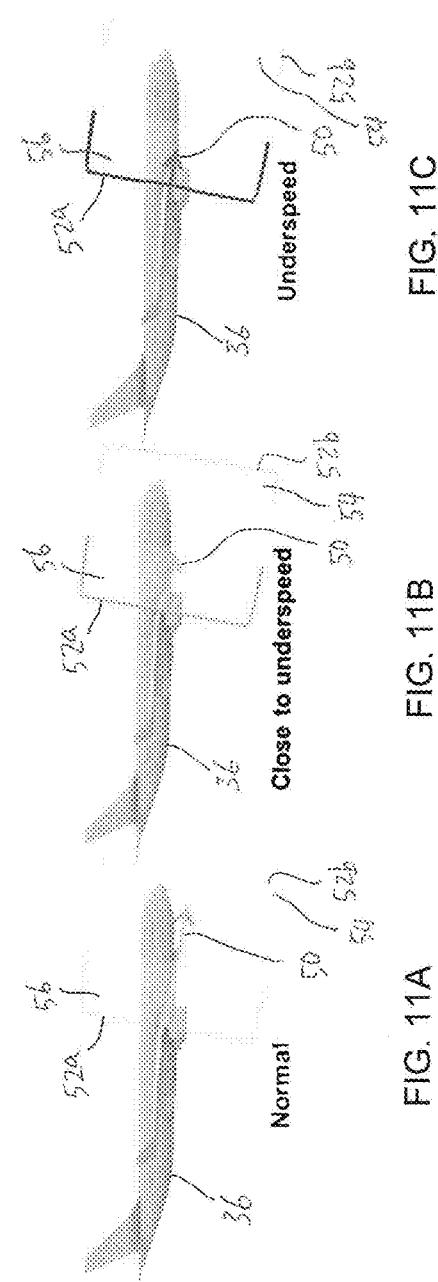

Hazardous Angle of Attack

High Angle of Attack

Normal

AIRCRAFT DISPLAY MANAGEMENT SYSTEM FOR FLIGHT ENVELOPE PROTECTION

FIELD OF THE DISCLOSURE

The present disclosure generally relates to aircraft control systems, and in particular relates to a display management system for flight envelope protection using display models.

BACKGROUND OF THE INVENTION

An aircraft has a flight envelope for describing its allowable performance limits with respect to operating speeds and various aircraft orientation angles. In certain cases, the flight envelope is referred to as a service or performance envelope including the physical limits of the capabilities of the aircraft.

For example, based on one or more flight envelope protection attributes, such as a load factor, an altitude, a pitch angle, a bank angle, and the like, the flight envelope is selected to provide an allowable boundary for the physical limits of the capabilities of the aircraft. It is desirable that the aircraft is not operated outside of the allowable boundary of the flight envelope.

Flight envelope protection may refer to an interface of the aircraft control system for preventing a pilot of the aircraft from executing control commands that surpass structural or aerodynamic operation restrictions for the aircraft. In emergency situations, it is important that the pilot is restricted from performing such control commands endangering the protection of the aircraft.

For example, when the pilot manipulates a side-stick to pitch the aircraft nose up, the control system creating the flight envelope protection will prevent the pilot from pitching the aircraft beyond the stalling angle of attack for the aircraft. Consequently, the flight envelope protection causes the control system to restrict or modify such a pitching command.

Typically, aircraft flight information is computed and displayed on a Primary Flight Display (PFD) system for the pilot. This information provides a Pilot Flying (PF) with required flight information regarding the status of Flight Control Modes, the associated flight protections, and the flight envelope limits. A Pilot Not Flying (PNF) performs other various aeronautical tasks, and monitors actions of the PF.

For example, when the PNF observes the PFD to verify the PF's actions, the PFD frequently provides excessively detailed flight information, thereby making it difficult to decipher each meaning of all displayed flight parameter values. Moreover, conventional PFD systems focus on displaying the flight parameter values only rather than showing the entire aircraft from an external perspective.

Therefore, there is a need for developing an improved aircraft display management system that is easy for the pilot to understand and analyze the flight information promptly for preventing structural damages or aeronautical disruptions for the aircraft.

SUMMARY OF THE INVENTION

Advantages are achieved by the present display management system (or tool) which automatically provides external images of the aircraft with the flight envelope information using graphical display models. An important aspect of the present display management system is that the present system is used to provide the flight envelope information in an elevational view of the aircraft. For example, a two- or three-dimensional representation of the aircraft is generated and displayed on a cockpit display having a field of view.

As described in greater detail below, a dynamic graphical representation of the aircraft is provided to the pilot during flight operation, and the graphical representation changes with a flight control law state. For example, when a current flight control law is degraded and thus induces a loss of one or more flight protection attributes, the present display management system selectively displays the lost protection attributes. Advantageously, the associated flight parameters and protection attributes are displayed based on the current flight control law.

Another advantage of the present display management system is that an automatic warning system is built into the present system for informing the pilot of any deviations of the flight parameters or protection attributes from the flight envelope limits. For example, hue and color techniques are utilized to visually emphasize color indications and other signals for the protection attributes. It is contemplated that the present display management system creates an interactive and visually engaging display for the pilot. The present display management system provides adequate attention to the important flight parameters and protection attributes, and prompt recognition of their meanings based on the hue and color techniques.

In one embodiment, a display management system is provided for displaying a graphical representation of flight envelope information of an aircraft. Included in the display management system is a control module being coupled to the display management system and programmed to control the graphical representation including at least one flight envelope protection attribute. A signal detection module receives signals from a plurality of sensors of the aircraft, and the received signals include associated parameter values for the at least one flight envelope protection attribute. A protection selection module selects the at least one flight envelope protection attribute based on the received signals and the parameter values. A display module displays the at least one flight envelope protection attribute on a display screen in relation to a flight control law state stored in a database using a display model of the aircraft from an elevational view based on the received signals and parameter values included in the received signals.

In another embodiment, a display management method is provided for providing a graphical representation of flight envelope information of an aircraft, and includes controlling the graphical representation including at least one flight envelope protection attribute based on a flight control law state stored in a database; receiving signals from a plurality of sensors of the aircraft, the received signals including associated parameter values for the at least one flight envelope protection attribute; selecting the at least one flight envelope protection attribute based on the received signals and the parameter values; and displaying the at least one flight envelope protection attribute on a display screen in relation to the flight control law state using a display model of the aircraft from an elevational view based on the received signals and the parameter values included in the received signals.

In yet another embodiment, an aircraft is provided having a display management system for providing a graphical representation of flight envelope information of the aircraft. The display management system including instructions to control the graphical representation including at least one flight envelope protection attribute based on a flight control law state stored in a database; to receive signals from a plurality of sensors of the aircraft, the received signals including associated parameter values for the at least one flight envelope protection attribute; to select the at least one flight envelope protection attribute based on the received signals and the parameter values; and to display the at least one flight envelope protection attribute on a display screen in relation to the flight control law state using a display model of the aircraft from an elevational view based on the received signals and the parameter values included in the received signals.

The foregoing and other aspects and features of the disclosure will become apparent to those of reasonable skill in the art from the following detailed description, as considered in conjunction with the accompanying drawings.

BRIEF DESCRIPTION OF THE DRAWINGS

FIGS. 4A-4C illustrate exemplary graphical representations of a longitudinal movement of the aircraft, using the display model in the elevational view and featuring various pitch attitudes;

FIG. 5 illustrates an exemplary graphical representation of a pitch protection attribute of the aircraft, using the display model in the elevational view having a cone-shaped zone;

FIGS. 10A-10C and 11A-11C illustrate exemplary graphical representations of a speed protection attribute of the aircraft, using the display model in the elevational view having a set of brackets and a speed vector arrow;

DETAILED DESCRIPTION OF THE PREFERRED EMBODIMENTS

Preferred embodiments of the present disclosure are described below by way of example only, with reference to the accompanying drawings. Further, the following description is merely exemplary in nature and is in no way intended to limit the disclosure, its application, or uses.

As used herein, the term "module," or "unit" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

Although children modules residing in their respective parent modules are shown, the broad teachings of the present system can be implemented in a variety of forms. Thus, while this disclosure includes particular examples and arrangements of the modules, the scope of the present system should not be so limited since other modifications will become apparent to the skilled practitioner.

Exemplary embodiments herein below are directed primarily to display management systems. However, the present system can be implemented for other types of products or services.

Figure 1:
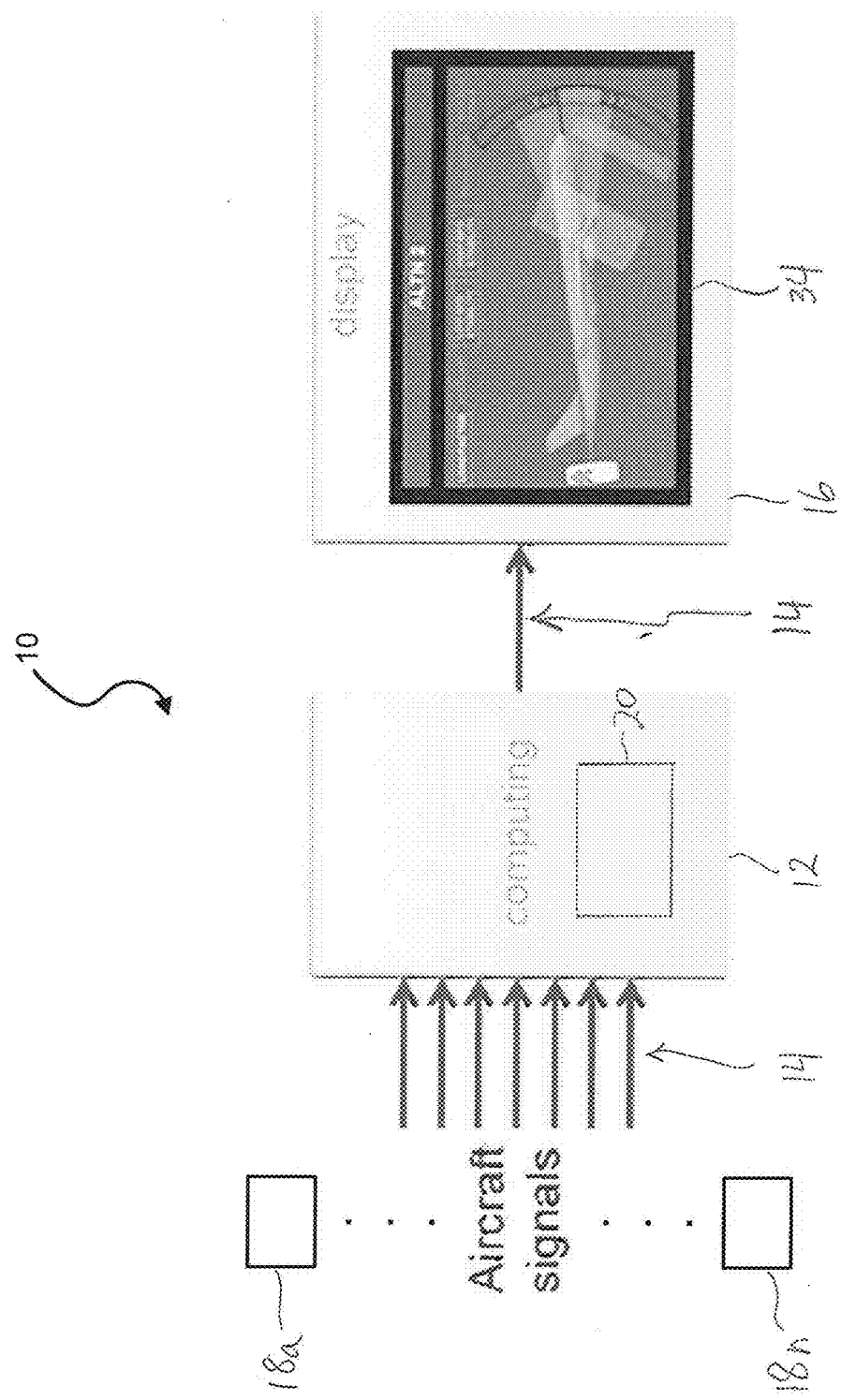
FIG. 1 illustrates an exemplary environment for the present display management system in accordance with an embodiment of the present disclosure.

Referring now to FIG. 1, an exemplary display management system for providing a graphical representation of flight envelope information of an aircraft is schematically illustrated and generally designated 10. The present display management system 10 is coupled to a computing device 12, and is programmed to perform tasks and control graphical illustration of relevant flight envelope attributes for different functional units via a network 14.

The present system 10 enables a pilot or other users to review the flight envelope information of the aircraft using a display device 16 having an image representation capability. It is contemplated that the computing device 12 receives signals from a plurality of sensors 18a-18n via the network 14 for providing the graphical representation of the flight envelope information. Exemplary sensors 18a-18n include, but are not limited to, speed sensors, angle sensors, accelerometers, slat/flap position sensors, and the like. Other types of flight parameters can also be accessible by collecting pilot's commands, for example, for aircraft configurations. It is also contemplated that the parameters can be computed by aircraft computer systems. The flight parameters may be calculated or determined based on actual aircraft signals received from the sensors 18a-18n. Other suitable sensors and parameters are also contemplated to suit different applications.

In this configuration, as described in greater detail below, the pilot or other users can readily acknowledge changes of the flight envelope information in relation to a flight control law state stored in a database 22 (FIG. 2), and promptly respond to any warnings or alarms relating to the changes. As an example only, if the flight control law state is degraded and consequently induces a loss of one or more flight envelope protection attributes, the display device 16 displays particular lost protection attributes with a warning message or indicator. It is contemplated that the present system 10 compares one or more sensed signals from the sensors 18a-18n with the flight control law state stored in the database 22 to determine whether the warning message or indicator associated with the respective flight envelop protection attribute should be displayed on the display device 16 for the pilot or other users.

Figure 2:
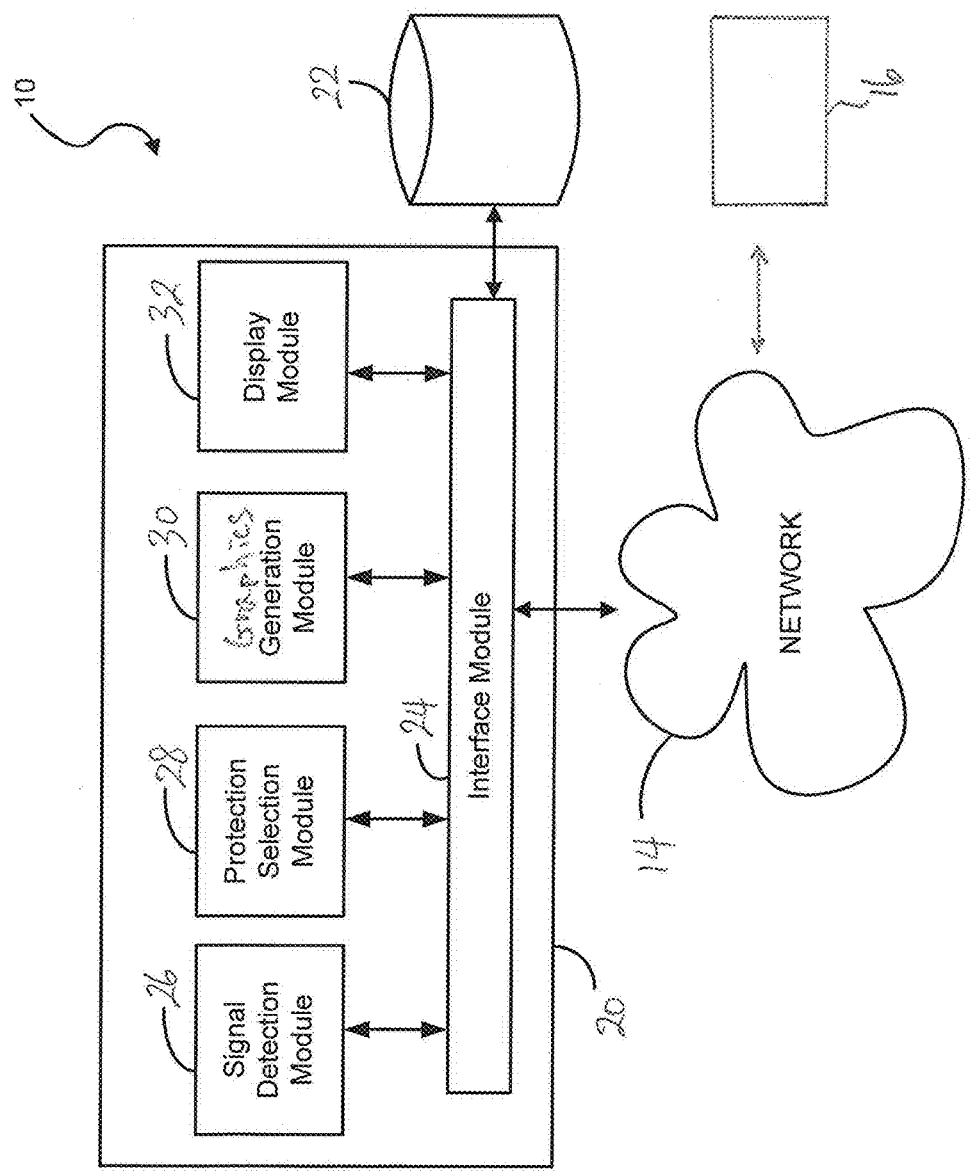
FIG. 2 is a functional block diagram of the present display management system in accordance with an embodiment of the present disclosure.

Referring now to FIGS. 1 and 2, it is preferred that the computing device 12 has a control module (CM) 20, which regulates and controls operation of the present system 10. In general, the CM 20 allows the pilot to access and view the representation of the flight envelope information. It is contemplated that the CM 20 is electronically connected to the network 14 to communicate with the plurality of sensors 18.

It is contemplated that the CM 20 is installed either in the computing device 12, the display device 16, or in a separate computing environment in the aircraft. In a preferred embodiment, all relevant information is stored in the database 22, e.g., as a data storage device and/or a machine readable data storage medium carrying computer programs, for retrieval by the CM 20 and its children modules as desired.

Further, the CM 20 includes an interface module 24 for providing an interface between the CM 20, the database 22, and the network 14. The interface module 24 controls the interface operation between, for example, the computing device 12, the display device 16, the network 14, and other related system devices, services, and applications. The other devices, services, and applications may include, but are not limited to, one or more software or hardware components, etc. The interface module 24 also receives signals from the sensors 18a-18n, e.g., sensed pitch and bank angle signals, which are communicated to the respective modules, such as the CM 20, and its children modules.

It is preferred that as one of the children modules, the CM 20 includes a signal detection module 26 that receives the signals from the plurality of sensors 18 of the aircraft. For example, a precise sensed pitch or bank angle of the aircraft is determined by the signal detection module 26 based on the received signals. It is contemplated that the received signals include associated parameter values for the flight envelope protection attributes. As discussed below, it is preferred that the flight envelope protection attributes are represented using one or more graphical indicators, such as a vector arrow and an animated chevron.

Also included in the CM 20 is a protection selection module 28 that selects at least one flight envelope protection attribute based on the received signals and parameter values. It is contemplated that the flight envelope protection attribute may include, but not be limited to, a pitch protection attribute, a bank protection attribute, an airspeed protection attribute, an acceleration visualization attribute, an angle of attack protection attribute, and the like. Other suitable flight envelope protection attributes are also contemplated to suit different applications.

A graphics generation module 30 of the CM 20 retrieves and generates a display model of the aircraft showing the at least one flight envelope protection attribute based on the received signals and parameter values of the aircraft. As discussed above, in the conventional systems, the review of flight envelope protection attributes related to the aircraft was a difficult task due to convoluted and overcrowded display elements and texts. However, in the present system 10, the flight envelope protection attributes are readily discernable due to simpler and more noticeable graphical indicators. The flight envelope protection attributes can be readily and promptly identified by illustrating the display model of the aircraft.

A display module 32 of the CM 20 controls a graphical representation of the display model from an elevational view of the aircraft, along with the graphical indicators of the flight envelope protection attributes. In the present display management system 10, identifying the flight envelope protection attributes related to the aircraft is faster and easier for the pilot because the display module 32 generates the display model for illustrating the flight envelope protection attributes of the aircraft along with the associated graphical indicators. Detailed descriptions of the graphical indicators are provided below.

Figure 3:
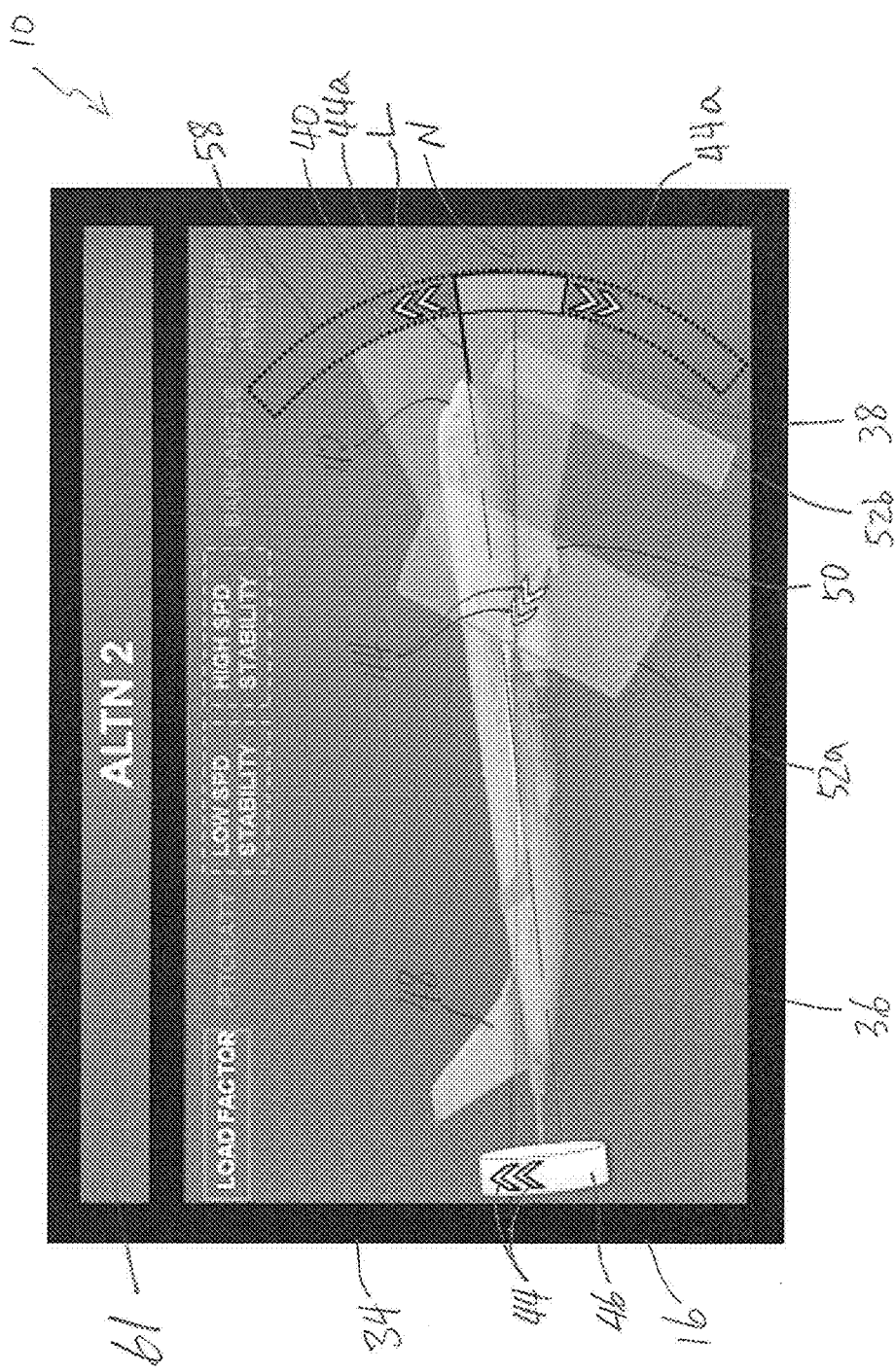
FIG. 3 illustrates an exemplary display screen of the present display management system of FIG. 1, featuring a display model of the aircraft in an elevational view.

Referring now to FIGS. 1 and 3, an exemplary display screen 34 of the present display management system 10 is shown. In this example, various graphical indicators and messages are illustrated on the display screen 34 of the display device 16. Each graphical indicator and message is related to the corresponding flight envelope protection attribute and flight control law of a current aircraft or spacecraft. Although the display model 36 of the current aircraft is shown as heading to the right side of the screen 34, other suitable orientations, e.g., to the left side of the screen, are also contemplated. As discussed further below, other suitable computer animation techniques, such as vector graphics and full motion videos, are also contemplated for representing computer graphics.

Referring now to FIGS. 3, 4A-4C, and 5, one of the corresponding flight envelope protection attributes, namely the pitch protection attribute, is described. In a preferred embodiment, the pitch protection attribute having a cone- or triangular-shaped zone 38 is displayed on the display screen 34. Specifically, the cone-shaped zone 38 includes an allowable pitch angle range delimited by a lower pitch angle limit $MIN_\theta$ and an upper pitch angle limit $MAX_\theta$, where $\theta$ denotes a pitch angle of the current aircraft.

It is preferred that a longitudinal movement of the current aircraft is illustrated using the display model 36 of the aircraft in a direction of travel of the aircraft. For example, in FIG. 4A, the display model 36 is shown as traveling at a zero or straight degree pitch angle $\theta$ relative to a navigational direction axis N of the aircraft. In FIG. 4B, the display model 36 is shown as traveling at a positive acute pitch angle (e.g., $0°<\theta<90°$) relative to the navigational direction axis N of the aircraft. Similarly, in FIG. 4C, the display model 36 is shown as traveling at a negative acute pitch angle (e.g., $-90°<\theta<0°$).

As an example only, the pitch protection attitude can be directly transcribed using the display model 36, as provided by expression (1):

$$\theta_{MODEL} = \theta_{AIRCRAFT} \quad (1)$$

where $\theta_{MODEL}$ is a pitch angle of the display model 36, and $\theta_{AIRCRAFT}$ is a sensed pitch angle of the current aircraft.

As shown in FIGS. 3 and 5, it is preferred that a front edge 40 of the cone-shaped zone 38 is disposed in front of or near a nose 42 of the display model 36 of the current aircraft. In operation, the pilot ensures that the aircraft is traveling within the allowable pitch angle range between the lower pitch angle limit $MIN_\theta$ and the upper pitch angle limit $MAX_\theta$.

An exemplary allowable pitch angle range is between the lower pitch angle limit $MIN_\theta$ of $-15°$ and the upper pitch angle limit $MAX_\theta$ of $+30°$ relative to the navigational direction axis N of the aircraft. It is preferred that the cone-shaped zone 38 in the allowable pitch angle range is shaded in GRAY color or any other desired color that is distinct from other background colors for identification of a safe navigation area.

Figures 6A, 6B, 6C:
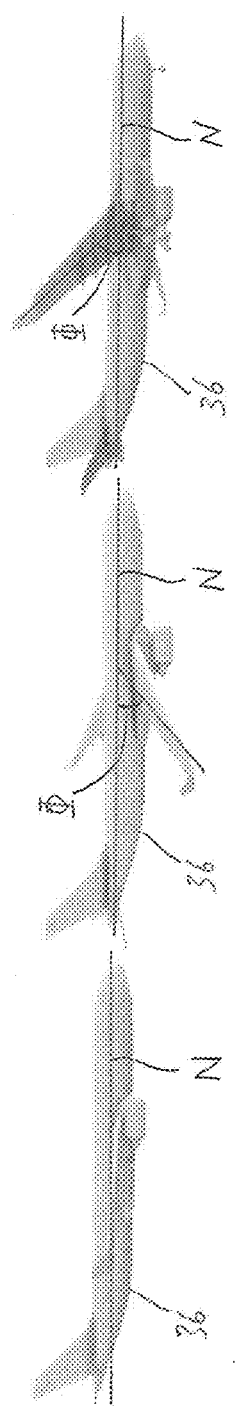
FIGS. 6A-6C illustrate exemplary graphical representations of a bank protection attribute of the aircraft, using the display model in the elevational view and featuring various bank angles.

Referring now to FIGS. 6A-6C, another one of the corresponding flight envelope protection attributes, namely the bank protection attribute, is described. It is contemplated that the bank protection attribute is displayed on the display screen 34 using the display model 36 and the hue and color techniques.

More specifically, it is preferred that a bank movement of the current aircraft is illustrated by changing a color of wings of the display model 36 of the aircraft based on a bank angle $\Phi$ of the aircraft. For example, in FIG. 6A, the display model 36 is shown as traveling at a zero degree bank angle $\Phi$ relative to the navigational direction axis N of the aircraft. In FIG. 6B, the display model 36 is shown as traveling at a positive acute bank angle Φ relative to the navigational direction axis N of the aircraft (e.g., 0°<Φ<90°) when a port wing is elevated. In FIG. 6C, the display model 36 is shown as traveling at a negative acute bank angle Φ (e.g., −90°<Φ<0°) when a starboard wing is elevated.

As an example only, the bank protection attribute can be directly transcribed using the display model 36, as provided by expression (2):

$$\Phi_{MODEL} = \Phi_{AIRCRAFT} \quad (2)$$

where $\Phi_{MODEL}$ is a bank angle of the display model 36, and $\Phi_{AIRCRAFT}$ is a sensed bank angle of the current aircraft.

Figures 7A, 7B, 7C:
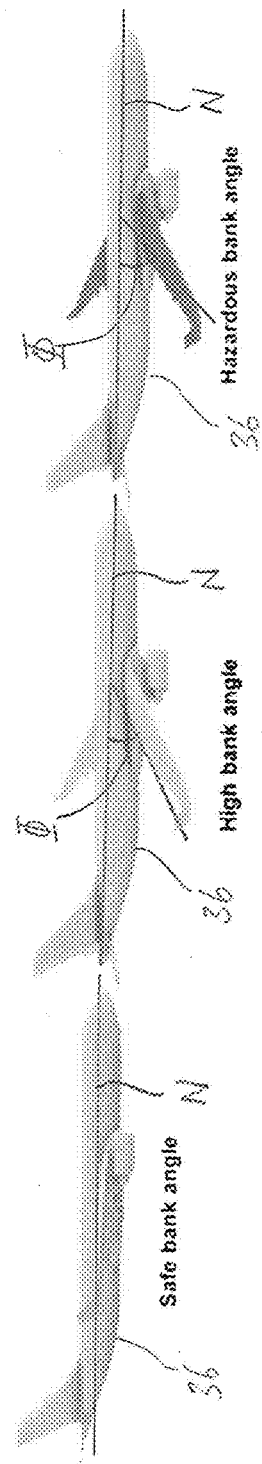
FIGS. 7A-7C illustrate exemplary graphical representations of the bank protection attribute of the aircraft shown in FIGS. 6A-6C, using color and hue techniques.

Referring now to FIGS. 7A-7C, an exemplary hue and color technique for the bank protection attribute is shown. In this configuration, the bank angle protection attribute is presented using different colors, such as GREEN, ORANGE and RED. As is the case with the allowable pitch angle range, an allowable bank angle range is delimited by a lower bank angle limit $MIN_\Phi$, and an upper bank angle limit $MAX_\Phi$, where Φ denotes the sensed bank angle of the current aircraft.

For example, as shown in FIG. 7A, when the bank angle Φ is within a first range of −33° and +33° (e.g., −33°<Φ<+33°) relative to the navigational direction axis N, no color or GREEN is indicated on wings of the aircraft, representing an allowable or safe bank angle of the aircraft. As an example only, the first range $\Phi_1$ can be defined by expression (3):

$$\Phi_1 \in [-33°; +33°] \quad (3)$$

where the lower bank angle limit is −33° and the upper bank angle limit is +33°.

However, as shown in FIG. 7B, when the sensed bank angle Φ is within a second range (e.g., −67°<Φ<=−33°; or +33°<=Φ<+67°) relative to the navigational direction axis N, which is outside of the first range, the color of the wings changes to ORANGE for visually warning the pilot. As an example only, the second range $\Phi_2$ can be defined by expression (4):

$$\Phi_2 \in [-67°; -33°] \cup [+33°; +67°] \quad (4)$$

where either the lower bank angle limit is −67° and the upper bank angle limit is −33°; or the lower bank angle limit is +33° and the upper bank angle limit is +67°.

Similarly, as shown in FIG. 7C, when the bank angle Φ is within a third range (e.g., −293°<Φ<=−67°; or +67°<=Φ<+293°) relative to the navigational direction axis N, which is outside of the first and second ranges, the color of the wings changes to RED for visually warning the pilot. As an example only, the third range $\Phi_3$ can be defined by expression (5):

$$\Phi_3 \in [-180°; -67°] \cup [+67°; +180°] \quad (5)$$

where either the lower bank angle limit is 180 and the upper bank angle limit is −67°; or the lower bank angle limit is +67° and the upper bank angle limit is +180. An angle greater than 180° is converted as an angle from the other direction. Other suitable hue and color techniques are also contemplated and applicable to different flight envelope attributes.

Figure 8:
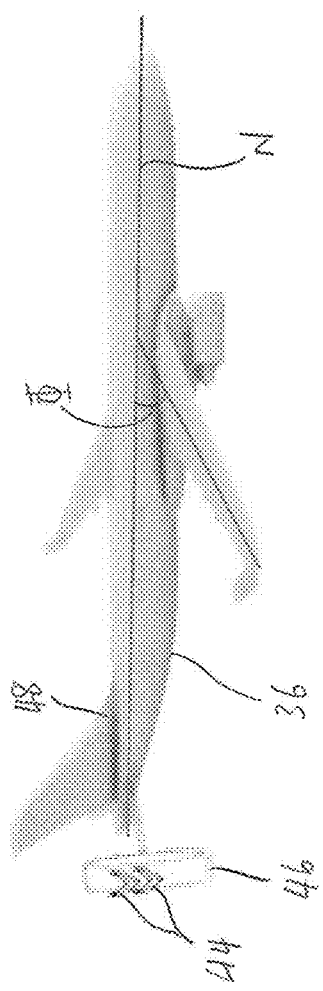
FIG. 8 illustrates an exemplary graphical representation of a bank angle tendency of the aircraft, using the display model in the elevational view having a moving chevron.

Referring now to FIGS. 3 and 8, it is contemplated that a bank angle tendency of the bank angle Φ is graphically represented by using at least one directional icon 44, such as a chevron, an arrow, or the like, being animated on a virtual circular-shaped path 46 relative to the navigational direction axis N of the aircraft. The bank angle tendency refers to a directional moving inclination of the sensed bank angle Φ of the aircraft. Preferably, the virtual path 46 is disposed at or near a tail 48 of the display model 36 of the current aircraft, and circularly moves clockwise or counterclockwise along the virtual path 46 relative to the navigational direction axis N. Thus, a traveling direction of the directional icon 44 instantly indicates whether the aircraft is rolling to the right or to the left.

More specifically, as is the case with the bank angle Φ, the bank angle tendency may be presented by rendering the directional icon 44 in different colors, such as ORANGE and red, based on a roll rate P of the aircraft. The roll rate P is a positive number when rolling to the right or clockwise, and a negative number when rolling to the left or counterclockwise, relative to the navigational direction axis N of the aircraft.

As an example only, a moving or rolling speed $V_{chevrons\ roll}$ of the directional icon 44 on the virtual path 46 can be defined, as provided by expression (6):

$$V_{chevrons\ roll} = k'' \cdot P \quad (6)$$

where k'' is a predetermined scale coefficient, and P is the roll rate of the aircraft. It is preferred that the directional icon 44 is not displayed with the display model 36 if a condition of |P|≤5°/second is met. For example, the directional icon 44 is compared with a predetermined threshold value of the roll rate P and displayed only when the roll rate P is significant enough to notify the pilot by the control module 20. It is contemplated that other flight parameter values are also compared with corresponding predetermined threshold values to determine visibility of graphical indicators or messages, such as the icon 44.

Figure 9:
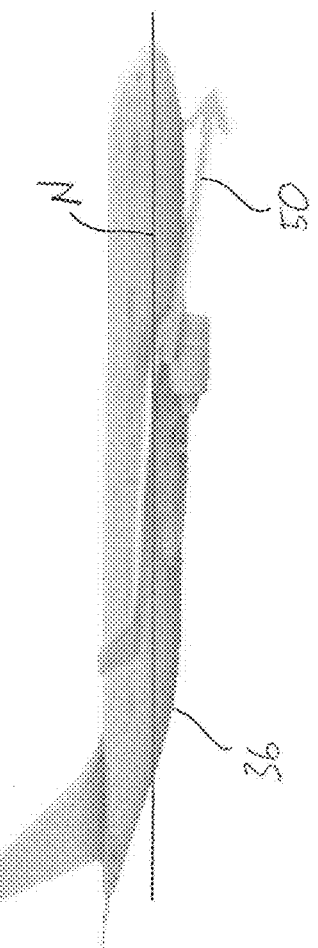
FIG. 9 illustrates an exemplary graphical representation of a speed vector in a vertical plane of the aircraft, using the display model in the elevational view.

Referring now to FIGS. 3 and 9, it is contemplated that an airspeed protection attribute is graphically represented by using a vector arrow 50 being extended from or near a center of the display model 36 relative to the navigational direction axis N of the aircraft. It is preferred that the vector arrow 50 is disposed on a vertical plane of the display model 36, and a length of the vector arrow is variably adjusted based on an actual sensed airspeed of the aircraft.

As an example only, the length L of the vector arrow 50 can be defined, as provided by expression (7):

$$L = k \cdot V \quad (7)$$

where k is a predetermined scale coefficient, and V is the actual sensed airspeed of the aircraft. It is contemplated that the vector arrow 50 is animated or moves in the vertical plane of the display model 36 to illustrate a velocity direction of the aircraft.

As an example only, the length of the vector arrow 50 can be defined, as provided by expressions (8) and (9):

$$V_x = k \cdot V \cdot \cos(\gamma) \quad (8)$$

$$V_y = k \cdot V \cdot \sin(\gamma) \quad (9)$$

where $V_x$ denotes a horizontal component of the vector arrow 50, and $V_y$ denotes a vertical component of the vector arrow 50. Further, k is a predetermined scale coefficient, V is the sensed actual airspeed of the aircraft, and γ denotes a speed slope or angle between the navigational direction axis N of the aircraft, and the velocity direction of the aircraft.

Referring now to FIGS. 3, 10A-10C and 11A-11C, it is also contemplated that the airspeed protection attribute is graphically represented by using a set of first and second brackets 52a and 52b, wherein the first bracket 52a is disposed at or near an origin or starting point of the vector arrow 50, and the second bracket 52b is disposed in front of or near an opposite or ending point of the vector arrow. As discussed in greater detail below, each bracket 52a, 52b has a "C"- or "U"-shape for defining a corresponding speed zone having a minimum value and a maximum value.

As similarly discussed above, the vector arrow 50 and the set of first and second brackets 52a, 52b can be displayed along with the display model 36 using the hue and color techniques. Specifically, as shown in FIGS. 10A and 11A, when the aircraft is operating in a normal or acceptable condition within allowable airspeed limits, the vector arrow 50 and the set of first and second brackets 52a, 52b are displayed in GREEN color.

However, when the actual sensed airspeed of the aircraft reaches excessive high speeds, the vector arrow 50 and the second bracket 52b are displayed in ORANGE color (FIG. 10B) for warning the pilot. A hazardous area defined by the second bracket 52b can be shaded in GRAY color for illustrating an excessive high speed zone 54. As the actual sensed airspeed of the aircraft increases, and thus the ending point of the vector arrow 50 reaches into the high speed zone 54, the color of the vector arrow and the second bracket 52b changes to ORANGE (FIG. 10B) for warning the pilot. However, when the vector arrow 50 progresses within the excessive high speed zone 54 by a predetermined amount, indicating that the airspeed of the aircraft is increasing, the color of the vector arrow and the second bracket 52b changes to RED (FIG. 10C).

Similarly, when the actual sensed airspeed of the aircraft reaches excessive low speeds, the vector arrow 50 and the first bracket 52a are displayed in ORANGE color (FIG. 11B) for warning the pilot. A hazardous area defined by the first bracket 52a can be shaded in GRAY color for illustrating an excessive low speed zone 56. As the actual sensed airspeed of the aircraft decreases, and thus the ending point of the vector arrow 50 reaches into the low speed zone 56, the color of the vector arrow and the first bracket 52a changes to ORANGE (FIG. 11B) for warning the pilot. However, when the vector arrow 50 progresses within the low speed zone 56 by a predetermined amount, indicating that the airspeed of the aircraft is decreasing, the color of the vector arrow and the first bracket 52a changes to RED (FIG. 11C).

As an example only, the vector arrow $V_{LR}$, designated 50, can be defined, as provided by expression (10):

$$V_{LR} \in [0;\ k \cdot \sqrt{n} \cdot V_{S1g}] \tag{10}$$

where $V_{LR}$ denotes the vector arrow 50 residing in the low speed zone 56 having an airspeed range of a minimum speed of zero knots and a maximum speed of $k \cdot \sqrt{n} \cdot V_{S1g}$, where k is 1.19, n is a load factor of the aircraft, and $V_{S1g}$ denotes a predetermined stalling speed of the aircraft under 1 gravitational force. In this airspeed range, the vector arrow 50 and the first bracket 52a are displayed in RED color (FIG. 11C).

More specifically, k is a threshold value used in a flight control system of the aircraft to provide a margin or a safety factor before reaching a stalling speed of the aircraft. For example, if a stall occurs at $\sqrt{n} \cdot V_{S1g}$, the pilot can be warned before the stall by providing time defined by k for performing corrective actions. Other suitable k values are contemplated to suit different applications. Also, the load factor n may refer to a ratio of a lift of the aircraft to its weight for representing a global measure of stress which a structure of the aircraft is subjected to. For example, the load factor is sensed by an accelerometer of the aircraft. When n=1, the structure of the aircraft is not subjected to stress.

As an example only, the vector arrow $V_{LO}$, designated 50, can be defined, as provided by expression (11):

$$V_{LO} \in [k \cdot \sqrt{n} \cdot V_{S1g};\ \sqrt{n} \cdot VLS] \tag{11}$$

where $V_{LO}$ denotes the vector arrow 50 residing in the low speed zone 56 having an airspeed range of a minimum speed of $$k \cdot \sqrt{n} \cdot V_{S1g}$$

and a maximum speed of $$\sqrt{n} \cdot VLS,$$

where k is 1.19, n is the load factor, $V_{S1g}$ denotes the predetermined stalling speed, and VLS denotes a lowest selectable airspeed of the aircraft. In this airspeed range, the vector arrow 50 and the first bracket 52a are displayed in ORANGE color (FIG. 11B).

As an example only, the vector arrow $V_{NG}$, designated 50, can be defined, as provided by expression (12):

$$V_{NG} \in [\sqrt{n} \cdot VLS;\ V_{MAXOPER}] \tag{12}$$

where $V_{NG}$ denotes the vector arrow 50 indicating a normal or acceptable airspeed having an airspeed range of a minimum speed of $$\sqrt{n} \cdot VLS$$

and a maximum speed of $V_{MAXOPER}$, where n is the load factor, VLS denotes the lowest selectable airspeed of the aircraft, and $V_{MAXOPER}$ denotes a maximum speed allowed during operation based on an aircraft configuration. In this airspeed range, the vector arrow 50 and the first and second brackets 52a, 52b are displayed in GREEN color (FIGS. 10A and 11A).

An exemplary $V_{MAXOPER}$ includes, but is not limited to, a maximum speed with a landing gear extended (VLE), a maximum speed with slats and flaps extended (VFE), depending on a specific aircraft configuration, a maximum operating speed (VMO), or a maximum operating Mach number (MMO). Other suitable speeds are contemplated to suit the application. It is contemplated that $V_{MAXOPER}$ has a different value depending on the aircraft configuration. The aircraft configuration is obtained by one or more of the sensors 18a-18n of the aircraft configuration (e.g., slat/flap sensors), or by the pilot's data entry for the aircraft configuration. For example, when the aircraft is in a clean configuration (e.g., without slats, flaps or landing gears extended), $V_{MAXOPER}$=VMO. When the slats or flaps are extended, $V_{MAXOPER}$=VFE. When the landing gears are extended, $V_{MAXOPER}$=VLE.

As an example only, the vector arrow $V_{HO}$, designated 50, can be defined, as provided by expression (13):

$$V_{HO} \in [V_{MAXOPER};\ V_{OVERSPEED}] \tag{13}$$

where $V_{HO}$ denotes the vector arrow 50 residing in the high speed zone 54 having an airspeed range of a minimum speed of $V_{MAXOPER}$ and a maximum speed of $V_{OVERSPEED}$, where $V_{MAXOPER}$ denotes the maximum speed allowed during operation based on the aircraft configuration, and $V_{OVERSPEED}$ denotes a warning speed at which an over speed or high speed warning occurs for the aircraft. In this airspeed range, the vector arrow 50 and the second bracket 52b are displayed in ORANGE color (FIG. 10B).

An exemplary $V_{OVERSPEED}$ includes, but is not limited to, VMO+6 knots, MMO+0.006, VLE+4 knots, or VFE+4 knots. Other suitable speeds are contemplated to suit the application. As discussed above, it is contemplated that $V_{OVERSPEED}$ has a different value depending on the aircraft configuration. For example, when the aircraft is in a clean configuration (e.g., without slats, flaps or landing gears extended), $V_{OVERSPEED}$=VMO+6 knots. When the slats or flaps are extended, $V_{OVERSPEED}$=VFE+4 knots. When the landing gears are extended, $V_{OVERSPEED}$=VLE+4 knots.

As an example only, the vector arrow $V_{HR}$, designated 50, can be defined, as provided by expression (14):

$$V_{HR} \in [V_{OVERSPEED}; V_{MAXREACH}] \quad (14)$$

where $V_{HR}$ denotes the vector arrow 50 residing in the high speed zone 54 having an airspeed range of a minimum speed of $V_{OVERSPEED}$ and a maximum speed of $V_{MAXREACH}$, where $V_{OVERSPEED}$ denotes the warning speed at which the over speed or high speed warning occurs for the aircraft, and $V_{MAXREACH}$ denotes a maximum speed reachable before damaging the aircraft, depending on the aircraft configuration. In this airspeed range, the vector arrow 50 and the second bracket 52b are displayed in RED color (FIG. 10C).

An exemplary $V_{MAXREACH}$ includes, but is not limited to, one or more predetermined sizing speeds (VD, VF, and VL) of the aircraft (e.g., 365 knots or 420 miles/hour). Structural damage of the aircraft can occur when the sizing speed is exceeded. Other suitable speeds are contemplated to suit the application. More specifically, the sizing speeds (VD, VF, and VL) are different from the VFE and VLE, and are determined based on the aircraft configuration. Each sizing speed (VD, VF, and VL) represents a separate predetermined speed based on the corresponding aircraft configuration. For example, when the aircraft is in a clean configuration, $V_{MAXREACH}$=VD. When the slats or flaps are extended, $V_{MAXREACH}$=VF. When the landing gears are extended, $V_{MAXREACH}$=VL.

Figure 12:
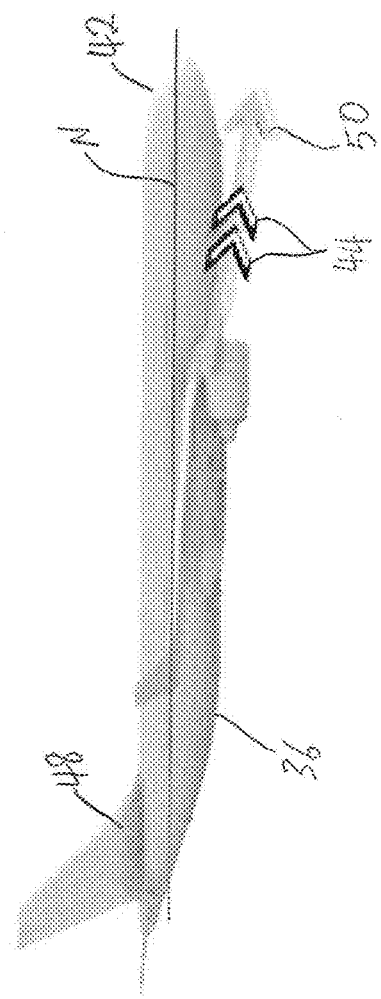
FIG. 12 illustrates an exemplary graphical representation of a speed tendency of the aircraft, using the moving chevron.
Figure 13C:
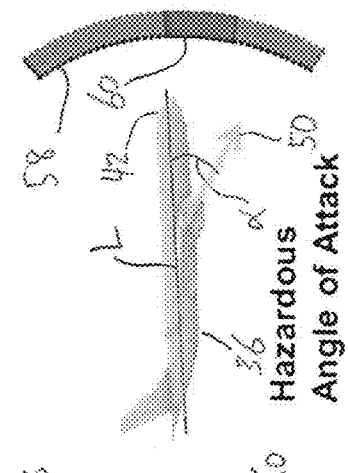
FIGS. 13A-13C illustrate exemplary graphical representations of an angle of attack protection attribute of the aircraft, using the display model in the elevational view having an arc segment with a color indicia.
Figure 13B:
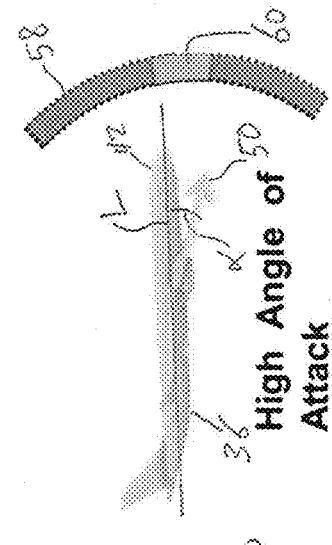

Referring now to FIGS. 3 and 12, it is contemplated that the acceleration visualization attribute is graphically represented by using the at least one directional icon 44, such as the chevron, the arrow, or the like, being animated along the vector arrow 50 of the display model 36. The acceleration visualization attribute is represented on the display screen 34 to inform the pilot about the acceleration or deceleration of the aircraft. For example, when the directional icon 44 is moving forward toward the nose 42 of the display model 36 along the vector arrow 50 (FIG. 12), the aircraft is accelerating. Conversely, when the directional icon 44 is moving backward toward the tail 48 of the display model 36 along the vector arrow 50 (FIG. 13), the aircraft is decelerating.

As an example only, a moving speed $V_{chevrons}$ of the directional icon 44 along the vector arrow 50 can be defined, as provided by expression (15):

$$V_{chevrons} = k' \cdot A \quad (15)$$

where k' is a predetermined scale coefficient, and A denotes an acceleration value of the aircraft, the acceleration value A being a positive number in case of an acceleration, and a negative number in case of a deceleration. Thus, the speed $V_{chevrons}$ of the directional icon 44 is commensurate or proportional with the acceleration value A.

As is the case with the moving or rolling speed $V_{chevrons\ roll}$ of the directional icon 44 on the virtual path 46 (FIG. 8), it is preferred that the directional icon 44 on the vector arrow 50 is not displayed with the display model 36 when $|A| \leq 0.1029$ miles/second$^2$. For example, the directional icon 44 is compared with a predetermined threshold value of the acceleration value A by the control module 20, and displayed only when the acceleration value A is significant enough to notify the pilot.

Referring now to FIGS. 3 and 13A-13C, it is contemplated that the angle of attack protection attribute is graphically represented by using the vector arrow 50 and the directional icon 44 being animated along the vector arrow. As shown in FIGS. 3 and 8-12, similar displaying techniques are applicable with respect to the vector arrow 50 and the directional icon 44. Also, similar hue and color techniques discussed above are applicable to the angle of attack protection attribute.

Specifically, a scale 58 having an indicator mark 60 is provided in front of or near the nose 42 of the display model 36 relative to a longitudinal axis L of the aircraft for illustrating an angle of attack $\alpha$ of the aircraft. For example, the scale 58 is an arc segment, and the indicator mark 60 is a rectangular-shaped bar embedded in the arc segment scale.

In this configuration, as wings of the aircraft change a corresponding angle of attack of the wing with respect to the airflow, a position of the indicator mark 60 is correspondingly adjusted on the scale 58 based on the changes of wing incidence angle. More specifically, the angle of attack refers to the angle between the wings' cord (i.e., a direction of the wings affixed to the aircraft) and a direction of the airspeed of the aircraft. As shown in FIG. 3, an angle of attack tendency of the angle of attack $\alpha$ is graphically represented by using the directional icon 44a, being animated on the scale 58 relative to the longitudinal axis L of the aircraft.

Figure 13A:
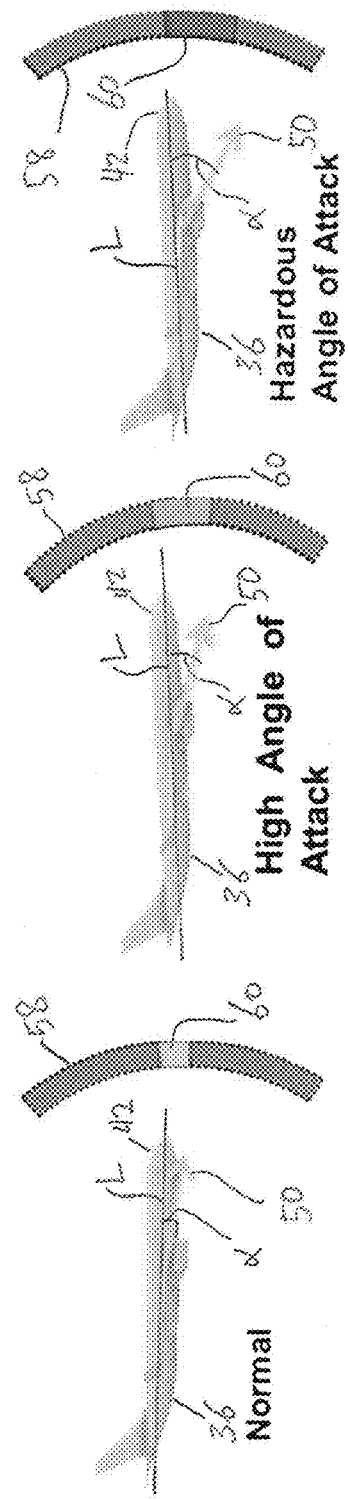

As similarly discussed above, it is contemplated that the color of the indicator mark 60 transitions between GREEN, ORANGE, and RED colors based on a value of the angle of attack $\alpha$. As an example only, an acceptable or normal angle of attack $\alpha_G$ can be defined, as provided by expression (16):

$$\alpha_G \in [k; \alpha_{hazard}] \quad (16)$$

where k is a minimum constant value (e.g., −5) of the angle of attack $\alpha$, and $\alpha_{hazard}$ denotes a predetermined hazardous angle of attack for the aircraft. More specifically, the minimum constant value of −5 may correspond to a minimum detectable angle in a flight simulator. Other suitable minimum constant values are also contemplated to suit the application. In this angle of attack range, the indicator mark 60 is displayed in GREEN color (FIG. 13A).

As an example only, a cautionary or high angle of attack $\alpha_O$ can be defined, as provided by expression (17):

$$\alpha_O \in [\alpha_{hazard}; \alpha_{SW}] \quad (17)$$

where $\alpha_{hazard}$ denotes the predetermined hazardous angle of attack for the aircraft, and $\alpha_{SW}$ denotes a stall warning angle of attack for the aircraft. In this angle of attack range, the indicator mark 60 is displayed in ORANGE color (FIG. 13B) for warning the pilot.

An exemplary hazardous angle of attack $\alpha_{hazard}$ includes, but is not limited to, $\alpha_{SW}$−0.5 for a clean configuration of the aircraft having no or minimal drag force, or $\alpha_{SW}$−1 for other slat/flap configurations of the aircraft. As an example only, a hazardous angle of attack $\alpha_R$ can be defined, as provided by expression (18):

$$\alpha_R \in [\alpha_{SW}; +90°] \quad (18)$$

where $\alpha_{SW}$ denotes the stall warning angle of attack for the aircraft. In this angle of attack range, the indicator mark 60 is displayed in RED color (FIG. 13C) for warning the pilot.

Figure 14:
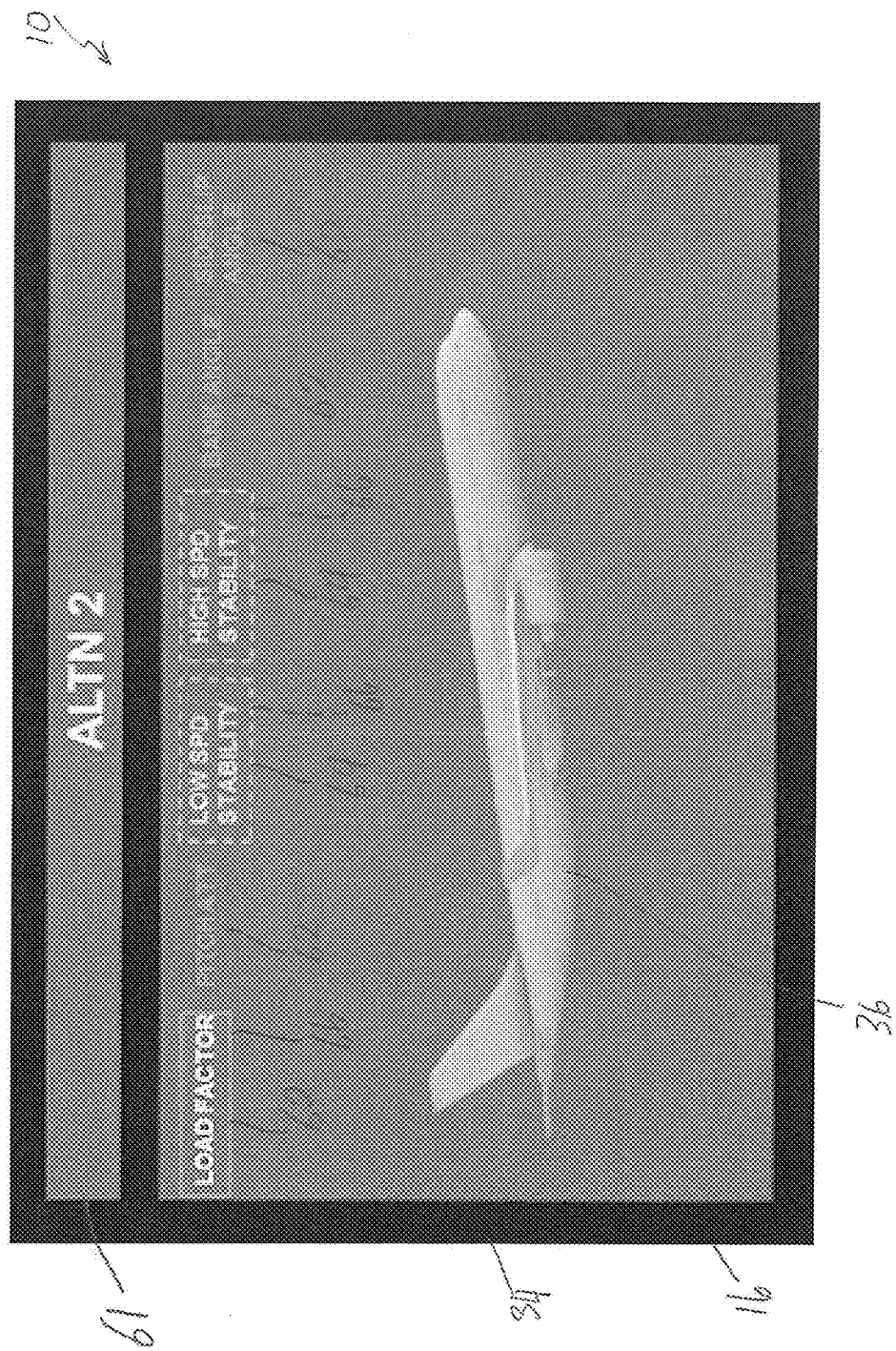
FIG. 14 illustrates an enlarged graphical representation of flight protection attribute labels and stability labels shown in FIG. 3.

Referring now to FIGS. 3 and 14, it is preferred that a status title 61 of current flight control law is displayed on top of the display screen 34. An exemplary status title 61 of the flight control law includes, but is not limited to, NORMAL for a fully automatic flight operating configuration, ALTN 1 and ALTN 2 for alternate flight operating configurations when failures of redundant aircraft systems are detected, or DIRECT for a manual flight control mode of the aircraft.

In a preferred embodiment, a protection label 62 associated with the current flight control law is displayed on the display screen 34 as desired. For example, when the flight envelope protection is engaged, one or more related protection labels 62 are displayed above the display model 36. Exemplary protection labels include, but are not limited to, LOAD FACTOR for the load factor, PITCH ATT for the pitch protection attribute, HIGH AOA for the high angle of attack, HIGH SPD for high airspeed, BANK ANGLE for the bank angle, or SIDESLIP ANGLE for a sideslip angle of the aircraft.

Similarly, it is preferred that a stability label 64 associated with the current flight control law is displayed on the display screen 34 as desired. Exemplary stability labels include, but are not limited to, LOW SPD STABILITY for a low speed stability, or HIGH SPD STABILITY for a high speed stability.

It is contemplated that each protection or stability label can be displayed using the hue and color techniques discussed above, or other suitable identification methods. For example, when the flight envelope protection is engaged, each protection label 62 is displayed in bold and enclosed within a box 66 bordered by a solid line.

However, when the flight envelope protection is disengaged but the stability of the aircraft is provided, each stability label 64 is written in GRAY color and enclosed within the box 66 bordered by a dotted line. Also, when both the flight envelope protection and the stability are disengaged, the protection label 62 is written in GRAY color without the box 66. Other suitable arrangements are contemplated to suit different applications.

While at least one exemplary embodiment of the present invention has been shown and described, it should be understood that modifications, substitutions and alternatives may be apparent to one of ordinary skill in the art and can be made without departing from the scope of the invention described herein. This application is intended to cover any adaptations or variations of the specific embodiments discussed herein. In addition, in this application, the terms "comprise" or "comprising" do not exclude other elements or steps, and the terms "a" or "one" do not exclude a plural number. Furthermore, characteristics or steps which have been described with reference to one of the above exemplary embodiments may also be used in combination with other characteristics or steps of other exemplary embodiments described above.

What is claimed is:

1. A display management system for providing a graphical representation of flight envelope information of an aircraft, comprising:
   a control module configured to be coupled to the display management system and programmed to control the graphical representation including at least one flight envelope protection attribute;
   a plurality of sensors associated with the flight envelope information of the aircraft;
   a signal detection module configured to receive signals from the plurality of sensors of the aircraft, the received signals including associated parameter values for the at least one flight envelope protection attribute;
   a protection selection module configured to select the at least one flight envelope protection attribute based on the received signals and the parameter values;
   a database configured to store data related to the flight envelope information of the aircraft;
   a display module configured to display the at least one flight envelope protection attribute on a display screen in relation to a flight control law state stored in the database using a display model of the aircraft from an elevational view based on the received signals and the parameter values included in the received signals; and
   at least one animated indicator related to a corresponding flight envelope protection attribute and flight control law of the aircraft, the at least one animated indicator being displayed onto or adjacent to a longitudinal axis of the display model in the elevational view on the display screen,
   wherein the graphical representation of the at least one animated indicator is dynamically modified based on a change of the corresponding flight envelope protection attribute and flight control law of the aircraft.

2. The display management system of claim 1, wherein the at least one flight envelope protection attribute includes at least one of: a pitch protection attribute, a bank protection attribute, an airspeed protection attribute, an acceleration visualization attribute, and an angle of attack protection attribute.

3. The display management system of claim 1, wherein a pitch protection attribute of the aircraft is displayed on the display screen using a cone-shaped zone.

4. The display management system of claim 1, wherein a bank protection attribute of the aircraft is displayed on the display screen using a hue and color technique.

5. The display management system of claim 4, wherein the bank protection attribute is displayed by changing a color of wings of the display model based on a sensed bank angle of the aircraft.

6. The display management system of claim 1, wherein a bank angle tendency of a sensed bank angle of the aircraft is displayed by using at least one directional icon being animated on a virtual path relative to a navigational direction axis of the aircraft.

7. The display management system of claim 6, wherein the at least one directional icon on the virtual path is displayed in different colors based on a roll rate of the aircraft.

8. The display management system of claim 1, wherein an airspeed protection attribute is displayed by using a vector arrow being extended near a center of the display model relative to a navigational direction axis of the aircraft.

9. The display management system of claim 8, wherein a length of the vector arrow is variably adjusted based on an actual sensed airspeed of the aircraft.

10. The display management system of claim 8, wherein the vector arrow is animated in a vertical plane of the display model to illustrate a velocity direction of the aircraft.

11. The display management system of claim 8, wherein the vector arrow is displayed in different colors based on an actual sensed airspeed of the aircraft.

12. The display management system of claim 8, wherein the airspeed protection attribute is displayed by using a set of first and second brackets, the first bracket being disposed near a starting point of the vector arrow, the second bracket being disposed near an opposite ending point of the vector arrow.

13. The display management system of claim 12, wherein at least one of the first and second brackets is displayed in different colors based on an actual sensed airspeed of the aircraft.

14. The display management system of claim 8, wherein an acceleration visualization attribute is displayed by using at least one directional icon being animated along the vector arrow of the display model.

15. The display management system of claim 1, wherein an angle of attack protection attribute is displayed by using a scale having an indicator mark relative to the longitudinal axis of the aircraft.

16. The display management system of claim 15, wherein a position of the indicator mark on the scale is adjusted based on a corresponding angle of attack of the wing.

17. The display management system of claim 1, wherein the control module is configured to compare the received signals from the plurality of sensors with the flight control law state stored in the database to determine whether the at least one flight envelope protection attribute should be displayed on the display screen.

18. A display management method for providing a graphical representation of flight envelope information of an aircraft, comprising:
- controlling the graphical representation including at least one flight envelope protection attribute based on a flight control law state stored in a database;
- receiving signals from a plurality of sensors of the aircraft, the received signals including associated parameter values for the at least one flight envelope protection attribute;
- selecting the at least one flight envelope protection attribute based on the received signals and the parameter values;
- displaying the at least one flight envelope protection attribute on a display screen in relation to the flight control law state using a display model of the aircraft from an elevational view based on the received signals and the parameter values included in the received signals;
- providing at least one animated indicator related to a corresponding flight envelope protection attribute and flight control law of the aircraft, the at least one animated indicator being displayed onto or adjacent to a longitudinal axis of the display model in the elevational view on the display screen; and
- modifying dynamically the graphical representation of the at least one animated indicator based on a change of the corresponding flight envelope protection attribute and flight control law of the aircraft.

19. An aircraft having a display management system for providing a graphical representation of flight envelope information of the aircraft, the display management system comprising instructions to:
- control the graphical representation including at least one flight envelope protection attribute based on a flight control law state stored in a database;
- receive signals from a plurality of sensors of the aircraft, the received signals including associated parameter values for the at least one flight envelope protection attribute;
- select the at least one flight envelope protection attribute based on the received signals and the parameter values;
- display the at least one flight envelope protection attribute on a display screen in relation to the flight control law state using a display model of the aircraft from an elevational view based on the received signals and the parameter values included in the received signals; and
- provide at least one animated indicator related to a corresponding flight envelope protection attribute and flight control law of the aircraft, the at least one animated indicator being displayed onto or adjacent to a longitudinal axis of the display model in the elevational view on the display screen; and
- modify dynamically the graphical representation of the at least one animated indicator based on a change of the corresponding flight envelope protection attribute and flight control law of the aircraft.

\* \* \* \* \*